United States Patent [19]

Summers et al.

[11] 4,100,325

[45] Jul. 11, 1978

[54] WEATHER RESISTANT COMPOSITES

[75] Inventors: James William Summers, Bay Village; George Joseph Kliner, Avon Lake, both of Ohio

[73] Assignee: The B. F. Goodrich Company, Akron, Ohio

[21] Appl. No.: 749,939

[22] Filed: Dec. 13, 1976

[51] Int. Cl.$^2$ .................. B32B 27/08; B44D 1/44
[52] U.S. Cl. .................. 428/334; 428/407; 428/515; 428/518; 428/520; 428/538; 260/42.29; 156/244; 156/166
[58] Field of Search ............... 428/407, 332, 334, 515, 428/518, 520, 538

[56] References Cited

U.S. PATENT DOCUMENTS

| | | | |
|---|---|---|---|
| 3,076,234 | 2/1963 | Paulus | 156/166 |
| 3,773,545 | 11/1973 | Erb et al. | 427/264 |
| 3,804,705 | 4/1974 | Kishikawa et al. | 428/518 |
| 3,890,268 | 6/1975 | Tanzilli et al. | 260/42.29 |

*Primary Examiner*—P. C. Ives
*Attorney, Agent, or Firm*—Joe A. Powell; J. Hughes Powell, Jr.

[57] ABSTRACT

Improved weather resistant products such as building siding, shutters, roof vents and the like, are made by coextruding or laminating a plasticized vinyl chloride capstock with a substrate of rigid vinyl chloride polymers, chlorinated vinyl chloride polymers, or acrylonitrile-butadiene-styrene polymers. The resulting composites are much improved over rigid PVC, chlorinated PVC, or ABS articles alone for retention of appearance and retention of impact on aging.

18 Claims, No Drawings

WEATHER RESISTANT COMPOSITES

BACKGROUND OF THE INVENTION

It is known to use rigid polymers for house siding, shutters, roof vents, camper tops and the like. Typical polymers for these uses are rigid polyvinyl chloride (PVC), as described in U.S. Pat. No. 3,890,268, chlorinated polyvinyl chloride (CPVC), and acrylonitrile-butadiene-styrene (ABS) polymers. These materials have excellent original impact resistance. Unfortunately, outdoor exposure to sunlight and consequent environmental weathering of these rigid materials results in reduced impact strength. ABS materials are particularly vunerable to sunlight exposure and must be protected for extended outdoor applications. Exposure to weather also causes these rigid materials, especially colors other than white or pastel, to change in appearance which is aesthetically undesirable.

SUMMARY OF THE INVENTION

It has been found that the use of a plasticized vinyl chloride containing from about 10 to less than about 35 parts by weight of plasticizer and at least 6 parts by weight of titanium dioxide per 100 parts by weight of vinyl chloride as a capstock over a substrate of rigid vinyl chloride, chlorinated vinyl chloride, or acrylonitrile-butadiene-styrene results in composites with improved appearance retention and improved impact resistance. Said composites are useful for building siding, such as house siding, shutters, roof vents, camper tops and the like. The capstock can be either coextruded with the desired substrate or laminated onto the desired substrate.

DETAILED DESCRIPTION

Capstocks suitable for use in this invention contain (1) a vinyl chloride polymer, (2) at least 6 parts by weight of titanium dioxide per 100 parts by weight of vinyl chloride polymer, and (3) from about 10 to less than about 35 parts by weight of plasticizer per 100 parts by weight of vinyl chloride polymer.

The first necessary ingredient of the capstock is a vinyl chloride polymer. Vinyl chloride polymeric materials suitable for use as the capstock in this invention include homopolymers, copolymers and blends of homopolymers and/or copolymers. Particularly suitable are vinyl chloride homopolymers with good porous structure to absorb the plasticizer.

The vinyl chloride polymers may contain from 0 up to about 40% and preferably less than 20% by weight of one or more other monovinylidene monomers (i.e., a monomer containing a single terminal $CH_2 = C <$ group per molecule), more preferably, not more than about 10% by weight of such monomers. Such other monomers include 1-olefins having from 2 to 8 and more preferably about 2 to 4 carbon atoms, such as ethylene, propylene, 1-butene, 1-hexene, 2-ethylhexene-1 and the like. Alkyl acrylates may be used wherein the alkyl group contains from 1 to 10 carbon atoms and more preferably from 2 to 8 carbon atoms, such as methyl acrylate, ethyl acrylate and the like, preferably gelled to less than 20%/wt. solubility in toluene. Other monovinylidene monomers such as styrene, acrylonitrile, acrylamides, vinyl acetate, vinylidene chloride and the like may also be used. A polymer containing one or more of said alkyl acrylates at a level up to about 65%/wt. may be diluted in any convenient manner with a vinyl chloride polymer not containing an alkyl acrylate phase to produce a final blend having an alkyl acrylate content of less than about 27%/wt., more preferably less than about 10%/wt.

The vinyl chloride polymeric materials of this invention have an inherent viscosity (measured using 0.2 gram of resin in 100 ml. of cyclohexanone at 30° C by ASTM D 1243) of from about 0.45 to about 1.2 and more preferably, from about 0.85 to about 1.2.

The second necessary ingredient of the capstock is titanium dioxide. Titanium dioxides suitable for use in this invention have a particle size of from about 0.1 micron to about 1.0 micron, more preferably from about 0.1 micron to about 0.4 micron. A typical medium particle diameter of titanium dioxide pigment is about 0.2 micron. The type of titanium dioxide used will vary depending on the desired color of the capstock. For white capstocks, it is desirable to use a mixture of rutile and anatase titanium dioxide according to the teachings of U.S. Pat. No. 3,890,268. For non-white capstocks, it is desirable to use non-chalking rutile titanium dioxide. The level of titanium dioxide must be greater than about 6 parts by weight per 100 parts by weight of vinyl chloride polymer. Preferably, the level of titanium dioxide is from about 10 to about 20 parts by weight per 100 parts by weight of vinyl chloride polymer.

The third necessary ingredient of the capstock is a suitable plasticizer. The level of plasticizer used is from about 10 to less than about 35 parts by weight of plasticizer per 100 parts by weight of vinyl chloride polymer. Preferably, the level of plasticizer used is from about 15 to about 25 parts by weight per 100 parts by weight of vinyl chloride polymer. This acceptable level of plasticizer is well below the levels normally employed in plasticizer PVC. Levels of plasticizer greater than 35 parts by weight per 100 parts by weight of vinyl chloride polymer have a tendency to migrate into the substrate thereby lowering the impact retention upon weathering of the composite. Suitable plasticizers for use in the capstock of this invention include phthalic acid and isophthalic acid diesters of benzyl or phenyl radicals, or of alkyl, alkoxyalkyl or cycloalkyl radicals containing from 1 to 24 carbon atoms, more preferably 4 to 16 carbon atoms, such as diisooctyl isophthalate, butyl benzyl phthalate, diphenyl phthalate, dimethyl phthalate, diisobutyl phthalate, diisoamyl phthalate, diisohexyl phthalate, di-n-hexyl phthalate, di-2-ethylhexyl phthalate, diisooctyl phthalate, di-n-octyl phthalate, diisodecyl phthalate, di-n-decyl phthalate, butyl nonyl phthalate, butyl decyl phthalate, isooctyl isodecyl phthalate, n-octyl n-decyl phthalate, di(butoxyethyl) phthalate, dicyclohexyl phthalate, and the like. Also suitable are diesters having the formula

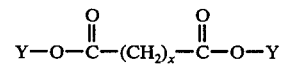

wherein X is from 6 to 10, and Y is a benzyl or phenyl radical, or an alkyl, alkoxyalkyl or cycloalkyl radical containing from 1 to 24 carbon atoms, more preferably 4 to 16 carbon atoms, such as diisobutyl adipate, diisooctyl adipate, di-2-ethylhexyl adipate, diisodecyl adipate, isooctyl isodecyl adipate, n-octyl n-decyl adipate, di(butoxyethyl)adipate, di-2-ethylhexyl azelate, diisooctyl azelate, dibenzyl sebacate, dimethyl sebacate, dibutyl sebacate, di-2-ethylhexyl sebacate, diisooctyl sebacate and the like. Also suitable are ricinoleates such as diethylene glycol monoricinoleate, methyl ricinoleate and the like. Triorganophosphates may also be used, such as triphenyl phosphate, cresyl diphenyl phosphate, tributyl phosphate and the like. The preferred plasticizers for use in this invention are liquid phthalate plasticizers. Excellent results were obtained using di-2-ethylhexyl phthalate and diisodecyl phthalate.

The vinyl chloride capstocks of this invention may contain other ingredients such as fillers, stabilizers, lubricants, processing aids, colorants, and others.

The vinyl chloride capstock is placed on the desired substrate by coextrusion or lamination to form a composite greatly improved in impact retention and appearance on weathering. Coextrusion is a process whereby two or more polymeric materials are simultaneously brought into contact with one another in juxtaposed relationship at a point prior to the extrusion thereof through a shapeforming extrusion die. The preferred method of coextrusion is the common manifold method described in U.S. Pat. No. 3,476,627. Lamination is a process whereby two or more products are shaped separately and then later applied together. The preferred method of lamination is to extrude the substrate and thereafter laminate the capstock onto the substrate by pressing the capstock and substrate together between two rolls while the substrate is still hot.

The thickness of the capstock used will vary depending on the end use of the composite. Normally at least 1 mil of capstock is needed to act as an ultraviolet light screener for the substrate. The maximum thickness of capstock that may be used can vary with the type of article produced. In order to maintain the desired rigid properties of the article, the capstock should not be greater than 50% of the total thickness of the composite. For applications such as building siding, shutters and the like, the thickness of capstocks used is from about 1 mil to about 10 mils, more preferably from about 2 mils to about 5 mils.

Substrates suitable for use in this invention include rigid vinyl chloride polymers (PVC), chlorinated vinyl chloride polymers (CPVC), and acrylonitrile-butadiene-styrene polymers (ABS) normally used in house siding, shutters, and the like.

Rigid vinyl chloride polymers suitable for use as the substrate in this invention include homopolymers, copolymers and blends of homopolymers and/or copolymers. Particularly suitable are blends of at least one tough, rubbery, essentially completely insoluble (gelled) alkyl acrylate polymer and at least one hard vinyl chloride resin in which a very small portion of the rubbery polymer is uniformly dispersed as a more or less continuous network to form superior high impact rigid resin formulations. Preferably the vinyl chloride polymers are substantially free of liquid plasticizers.

The vinyl chloride polymers may contain from 0 up to about 40% and preferably less than 20% by weight of one or more other monovinylidene monomers (i.e., a monomer containing a single terminal $CH_2 = C <$ group per molecule), more preferably, not more than about 10% by weight of such monomers. Such other monomers include 1-olefins having from 2 to 8 and more preferably about 2 to 4 carbon atoms, such as ethylene, propylene, 1-butene, 1-hexene, 2-ethylhexene-1 and the like. Alkyl acrylates may be used wherein the alkyl group contains from 1 to 10 carbon atoms and more preferably from 2 to 8 carbon atoms, such as methyl acrylate, ethyl acrylate and the like, preferably gelled to less than 20%/wt. solubility in toluene. Other monovinylidene monomers such as styrene, acrylonitrile, acrylamides, vinyl acetate, vinylidene chloride and the like may also be used. A polymer containing one or more of said alkyl acrylates at a level up to about 65%/wt. may be diluted in any convenient manner with a vinyl chloride polymer not containing an alkyl acrylate phase to produce a final blend having an alkyl acrylate content of less than about 20%/wt., more preferably less than about 10%/wt.

The vinyl chloride polymeric polymers of this invention have an inherent viscosity (measured using 0.2 gram of resin in 100 ml. of cyclohexanone at 30° C by ASTM D 1243) of from about 0.45 to about 1.2 and more preferably, from about 0.85 to about 1.2.

Especially useful vinyl chloride compositions contain a crosslinked rubbery acrylate polymer. A gelled polyacrylate may be mixed with a vinyl chloride base resin and subjected to intense mechanical shear to effect fusion into an integral mass and proper dispersion of the gelled polyacrylate as described in U.S. Pat. No. 3,644,576. For example, the vinyl chloride polymer is generally a blend of (1) a thermoplastic vinyl chloride resin free of plasticizer and selected from the group consisting of polyvinyl chloride and copolymers of vinyl chloride and propylene containing from about 0.5 to about 10%/wt. of combined propylene and (2) a rubbery, essentially completely gelled polymer of a monomeric mixture free of conjugated unsaturation and comprising at least about 80% by weight of an alkyl acrylate in which the alkyl group contains from 2 to 4 carbon atoms, up to about 19.5% by weight of a monomer copolymerizable with said alkyl acrylate and containing a single $CH_2 = C <$ group per molecule, and from about 0.5 to about 8% by weight of a gel-inducing monomer copolymerizable with said alkyl acrylate. Said gel-inducing monomer is selected from the class consisting of (a) a monomeric acrylic polyester of a polyhydric alcohol and of an acrylic acid selected from the class consisting of acrylic and methacrylic acids and containing from 2 to 6 acrylic ester groups per polyester molecule and (b) a polyalkenyl polyether of a polyhydric alcohol containing from 2 to 6 alkenyl ether group per molecule and in which the said alkenyl ether groups are each present in the structure $CH_2 = C <$. Said acrylate polymer evidences a solubility in toluene at room temperature to the extent of less than 20%/wt. and is present in said blend as dispersed particles of average diameter between about 500 and about 8000 A. Said thermoplastic resin exhibits an inherent viscosity as determined at 30° C. According to ASTM D 1243, employing 0.2 gram resin in 100 ml. of cyclohexanone, if polyvinyl chloride of between 0.45 and 1.20, and, if a copolymer of vinyl chloride and propylene of between 0.55 and 11.60. Said blend contains as polymeric ingredients from about 2% to about 20% by weight of said gelled acrylate polymer and from about 80% to about 98% by weight of said vinyl chloride resin.

Alternatively, a gelled polyacrylate may be subjected to a one-step overpolymerization by vinyl chloride as described in U.S. Pat. No. 3,632,679. For example, the final polymer generally comprises macro-granules produced by polymerization in aqueous suspension. The granules consist of a (1) matrix of a hard, thermoplastic vinyl chloride resin selected from the class consisting of polyvinyl chloride and copolymers of from about 93% to about 99%/wt. of combined vinyl chloride and from about 1 to about 7%/wt. of combined propylene and (2) particles from about 1500 to about 8000 A in average diameter dispersed uniformly in said matrix and consisting of a tough, rubbery, essentially completely-gelled copolymer of a monomeric material consisting of (a) an alkyl acrylate in which the alkyl group contains from 2 to 4 carbon atoms and (b) from about 1% to about 4%/wt. of a monomeric acrylic polyester of a polyalkylene glycol and of acrylic acid containing from 2 to 6 acrylate ester groups per polyester molecule. Said rubbery copolymer exhibits a solubility in toluene at room temperature below about 10%/wt. and constitutes from about 5 to about 20%/wt. of the composite product. Said composite resinous polymerization product is a rigid material possessed of high resistance to impact.

A gelled polyacrylate may also be overpolymerized upon a vinyl chloride seed resin and the resulting material subjected to a second-step overpolymerization by vinyl chloride, as described in U.S. Pat. No. 3,760,035.

Said two-step overpolymerization process described briefly hereinabove comprises the following procedure:

1. A vinyl chloride latex seed resin is prepared having particles from about 200 A to about 1250 A in average diameter (as determined by means of a soap titration procedure) by polymerizing in an aqueous dispersion containing one or more water-soluble dispersants, a monomeric material consisting of liquid monomeric vinyl chloride, optionally not more than about 20%/wt. of said total monomeric material of one or more monovinylidene monomers copolymerizable in aqueous dispersion with vinyl chloride, and optionally, from about 0.25% to about 5%/wt. of a crosslinking monomer free of conjugated unsaturation and containing at least two $CH_2 = C <$ groups per molecule which demonstrate different reactivities in polymerization with vinyl chloride.

2. Said vinyl chloride latex seed resin is combined with:
   a. a monomeric mixture free of conjugated unsaturation and consisting of (i) at least 80%/wt. of an alkyl acrylate in which the alkyl groups contain from 2 to 8 carbon atoms, (i) not more than a total of 19.5%/wt. of one or more monovinylidene monomers copolymerizable in aqueous dispersion with said alkyl acrylate, and (iii) from about 0.5% to about 8%/wt. of a crosslinking monomer containing at least two $CH_2 = C <$ groups per molecule;
   b. selected polymerization adjuvents, if necessary, including a water-soluble peroxygen catalyst and one or more of said water-soluble dispersants both in proportions to effect polymerization of said monomeric mixture (a) in aqueous dispersion on said seed resin particles without significant new polymer particle initiation, and
   c. water, if required. The resulting aqueous dispersion medium contains no significant proportions of chain-terminating polymerization modifiers. Polymerization of said monomeric mixture (a) is effected in said medium to form a latex product in which the original seed resin latex particles are coated with a shell of the resulting rubbery gelled acrylate copolymer ranging from about 50 A to about 500 A in thickness as determined by calculation based on a soap titration procedure, the said rubbery acrylate copolymer of said shell being soluble in toluene at room temperature to the extent of less than about 20%/wt. as determined by an ultra-centrifuge procedure. The material of said shell constitutes from about 12% to about 99.7%/wt. of the total weight of said coated particles.

3. Said step (2) rubber-coated latex particles are combined with:
   a. a monomeric material consisting of liquid monomeric vinyl chloride and not more than a total of 10%/wt. of one or more monovinylidene monomers copolymerizable with vinyl chloride in aqueous suspension, and, if necessary,
   b. a peroxygen polymerization catalyst,
   c. a polymerization suspension of dispersing agent, and (d) water.

4. Polymerization of said step (3) (a) monomeric material is effected in the resulting aqueous medium to produce a polymeric product containing said rubber acrylate coated latex particles encased in a matrix of hard, vinyl chloride resin, said last-named polymeric product containing from about 3% to about 65%/wt. of its total weight of said rubbery, gelled acrylate copolymer.

As indicated above, the macrogranular product obtained in the second overpolymerization will contain from about 3% to about 65%/wt. of the polyacrylate ingredient; more usually, this amount is from about 10% to about 40%/wt. of the polyacrylate ingredient. Such second overpolymerization product can be diluted in any convenient manner with vinyl chloride resin not having a rubbery polyacrylate phase to produce a final blend having an average concentration of polyacrylate from about 3 to about 6 phr. Such final granular blend may be fluxed, fused and masticated to homogeneity under fairly intensive shear in or on a mixer apparatus having its metal surfaces in contact with the plastic maintained at a temperature somewhat above what has been the practice with most rigid vinyl chloride resins, i.e., between about 350° and 440° F., more preferably between about 375° and 420° F. Stock temperatures will usually be slightly higher than this during such mechanical working.

Chlorinated vinyl chloride polymers (CPVC) are suitable as a substrate of this invention. The vinyl chloride materials described above may be chlorinated by the method shown in U.S. Pat. No. 2,996,489.

The chlorinated vinyl chloride polymers suitable for use as a substrate in this invention have a chlorine content ranging from about 60% to about 69%/wt. and more preferably from about 65% to about 67%/wt.

The chlorinated vinyl chloride substrates of this invention may contain other ingredients such as fillers, stabilizers, lubricants, processing aids, impact modifing resins, colorants, and others.

Acrylonitrile-butadiene-styrene (ABS) polymers are suitable for use as the substrates of this invention. As is well known, ABS resins are polymeric materials made from acrylonitrile, butadiene, and styrene. Some ABS resins are made by polymerizing all three ingredients together. Others are made by block polymerization involving different ones or different mixtures of the three materials in different stages. Still others are made by polymerizing different pairs of these three materials and then blending the copolymers to produce a resin blend containing all three materials. ABS materials suitable for use as substrates in this invention contain from about 15% to about 35% acrylonitrile, from about 10% to about 35% butadiene, and from about 45% to about 65% styrene. Preferably, said materials contain from about 18% to about 24% acrylonitrile, from about 27% to about 33% butadiene, and from about 46% to about 52% styrene.

The ABS substrates of this invention may contain other ingredients such as fillers, stabilizers, antioxidants, colorants, and others.

The composites of this invention exhibit improved appearance and improved retention of impact upon weathering. The weathering program included exposures of 6-inch by 6-inch panels, 50 mils thick, at 45° elevation facing south, in Florida and Arizona for periods of 6, 12, 18 and 24 months. Test evaluations included the Variable Height Impact Test (VHIT) for impact retention and visual examination for appearance change.

The Variable Height Impact Test is described by R. C. Neuman in *Polymer Engineering and Science, Vol. 6*, No. 2, pp. 124-127 (1966). The test is also described in *National Bureau of Standards Voluntary Product Standard* PS55-72, pp 4-5. The test is believed to yield more meaningful weatherability data than a variety of other test methods used heretofore. A 6-inch by 6-inch panel, 50 mils thick, described heretofore, is used for testing. The testing equipment consists of a forty-inch long vertical graduated tube which guides a weight dropped against a one-half-inch diameter hammer from varying heights. The hammer rests its hemispherical head upon the specimen lying upon an annular pedestal. The weight strikes the hammer, driving the one-half-inch diameter head through the specimen and into a 0.640-inch hole in the pedestal. Potential energy in inch-pounds is read directly from calibration marks on the graduated tube. An "$F_{50}$" (value at which 50% of the samples fail) calculation is made as described by Neuman in units of inch-pounds/50 mils or in inch-pounds/mil. Variable Height Impact Test Values after outdoor sample exposure are reported as percentages of unexposed sample test values.

Visual evaluation for appearance retention is made by averaging the ratings of a given sample by a minimum of 3 people. A scale of 1 to 6 is used as follows:
1 - Perfect; no change
2 - Slight change
3 - Moderate change - acceptable
4 - Change - unacceptable
5 - Poor
6 - Catastrophic failure The following examples are intended to illustrate the present invention more fully.

EXAMPLE I

This example is presented to show the effect of plasticizer level in the capstock on retained impact resistance of the composite upon weathering. An unplasticized PVC substrate with a thickness of 45 mils is coextruded by the common manifold method with a plasticized PVC capstock of 3 mils to form a composite. The substrate used is as follows:

TABLE I

| MATERIAL | PARTS/WT. |
|---|---|
| PVC - Medium Mol. Wt.(1) | 100.0 |
| Tin Stabilizer | 2.5 |
| TiO$_2$ | 15.0 |
| Processing Aid | 3.0 |
| Lubricants | 4.0 |
| Color Pigments | 0.3 |

(1)Inherent Viscosity 0 92

The following capstocks are coextruded with the above substrate to form a composite:

TABLE 2

| MATERIAL PARTS/WT. | CAPSTOCK A | CAPSTOCK B |
|---|---|---|
| PVC - High Mol. Wt.(2) | 100.00 | 100.00 |
| Tin Stabilizer | 2.00 | 2.00 |
| TiO$_2$ | 10.00 | 10.00 |
| Lubricant | 1.00 | 1.00 |
| Color Pigment | 0.05 | 0.05 |
| Diisodecyl Phthalate Plasticizer | 20.00 | 35.00 |

(2)Inherent Viscosity 1.12

Each of the above capstocks is coextruded with the above substrate to form house siding. The siding is cut into 6-inch by 6-inch panels which were tested, exposed outdoors and retested. The test results are reported in Table 3. Sample A has capstock A on the substrate listed in Table 1, while Sample B has capstock B on the substrate listed in Table 1.

TABLE 3

| | SAMPLE A | SAMPLE B |
|---|---|---|
| Original VHIT, Inch-lbs/50 Mils | 146 | 145 |
| Percent Retained VHIT After Aging | | |
| 6 months Florida | 82% | 80% |
| 12 months Florida | 89% | 84% |
| 24 months Florida | 67% | 7% |

The above results show that impact retention is improved when 20 parts by weight of plasticizer is used versus 35 parts by weight of plasticizer.

EXAMPLE II

This example is presented to show the effect of the level of TiO$_2$ on impact retention of a vinyl chloride polymer capstock. Table 4 gives the recipes used to evaluate various levels of TiO$_2$.

TABLE 4

| MATERIAL PARTS/WT. | C | D | E | F |
|---|---|---|---|---|
| Vinyl Chloride Polymer(3) | 100.0 | 100.0 | 100.0 | 100.0 |
| Tin Stabilizer | 1.9 | 1.9 | 1.9 | 1.9 |
| Lubricants | 1.9 | 1.9 | 1.9 | 1.9 |
| Processing Aid | 1.5 | 1.5 | 1.5 | 1.5 |
| Di-2-ethylhexyl Phthalate Plasticizer | 19.0 | 19.0 | 19.0 | 19.0 |
| Color Pigment | 1.0 | 1.0 | 1.0 | 1.0 |
| TiO$_2$ | 0 | 2.0 | 5.0 | 15.0 |

(3)Vinyl chloride polymer containing 5%/wt. of poly-n-butyl acrylate and having an inherent viscosity of about 0.92.

Each of the above capstocks are extruded to form house siding and the siding cut into 6-inch by 6-inch panels which were tested, exposed outdoors for 2 years in Florida and then retested. The test results are reported in Table 5.

TABLE 5

| | SAMPLE C | D | E | F |
|---|---|---|---|---|
| Original VHIT Inch-lbs/50 mils | 48 | 45 | 51 | 53 |
| Percent Retained After 2 Years in Florida | 4% | 18% | 23% | 77% |

EXAMPLE III

This example is presented to show the effect of the level of TiO$_2$ in the capstock in impact retention of the composite. The composite consists of a PVC substrate with a PVC capstock. Capstocks listed in Table 4 as Samples E and F are each coextruded onto a PVC substrate. Capstock E has 5 parts/wt. of TiO$_2$ while capstock F has 15 parts/wt. of $TiO_2$. The substrate used is given in Table 6 below.

TABLE 6

| MATERIAL | PARTS/WT. |
| --- | --- |
| Vinyl Chloride Polymer | 100.0 |
| Tin Stabilizer | 1.9 |
| Lubricants | 3.5 |
| Processing Aid | 1.5 |
| $TiO_2$ | 14.0 |

Capstocks E and F are coextruded by the common manifold method with the above substrate to form house siding. The siding is cut into 6-inch by 6-inch panels which are tested, exposed outdoors and retested. The test results are reported in Table 7. Sample G is a composite of Capstock E with the substrate listed in Table 6 and Sample H is a composite or Capstock F with the substrate listed in Table 6.

TABLE 7

| | SAMPLE | |
| --- | --- | --- |
| | G | H |
| Original VHIT Inch-lbs/50 Mils | 158 | 156 |
| Percent Retained VHIT After 2 Years in Florida | 45% | 77% |

This example shows that the composite with a capstock having 15 parts/wt. of $TiO_2$ has greatly improved retention of impact as compared to the composite with a capstock having only 5 parts/wt. of $TiO_2$.

EXAMPLE IV

This example is presented to show the improved retention of appearance when a plasticized PVC capstock is used on a substrate of either rigid PVC, chlorinated PVC, or ABS. A grey plasticized PVC containing 20 parts by weight of plasticizer and 15 parts by weight of $TiO_2$ is coextruded by the common manifold method with each of three substrates of rigid PVC, chlorinated PVC, and ABS. These composites are compared with a control rigid PVC house siding for retention or appearance after aging. Table 8 gives the appearance ratings after aging at 45° F south in Florida.

TABLE 8

| | APPEARANCE RATING | |
| --- | --- | --- |
| HOUSE SIDING MATERIAL | One Year | Two Years |
| Grey Rigid PVC Control | 3 | 4 |
| Grey Plasticized PVC/Rigid PVC | 2 | 2 |
| Grey Plasticized PVC/Chlorinated PVC | 2 | 2 |
| Grey Plasticized PVC/ABS | 2 | 2 |

This example shows that when a plasticized PVC capstock, as disclosed in this invention, is used over a substrate of either rigid PVC, CPVC, or ABS, the appearance retention after aging is greatly improved over the appearance retention of the substrate without a protective capstock.

EXAMPLE V

This example is presented to show the improved retention of impact of ABS with a plasticized vinyl chloride capstock as compared to ABS without a capstock. An ABS polymer containing about 20% acrylonitrile, 30% butadiene, and 50% styrene is coextruded by the common manifold method with a polyvinyl chloride capstock as disclosed in Sample F of Table 4. Table 9 is a comparison of the retained VHIT results of the composite with a one-piece extrusion of ABS after both had been aged for 2 years in Arizona.

TABLE 9

| MATERIAL | PERCENT RETAINED IMPACT |
| --- | --- |
| Composite - ABS/Capstock | 51% |
| ABS - One Piece Extrusion | 2% |

This example shows that when the ABS polymer is protected by the plasticized capstock, the retained impact resistance is greatly improved.

EXAMPLE VI

This example is presented to show the improved retention of impact resistance of a composite of a plasticized PVC capstock/rigid PVC substrate versus a control rigid PVC without a capstock. A grey plasticized PVC capstock containing 20 parts by weight of plasticizer and 15 parts by weight of $TiO_2$ is coextruded by the common manifold method with a rigid PVC substrate to form a composite. The capstock has a thickness of 3 mils and the substrate has a thickness of 45 mils. The composite and the control rigid PVC are cut into 6-inch by 6-inch panels which are tested, exposed outdoors and retested. The test results are reported in Table 10. Sample I is the control rigid PVC siding while Sample J is the composite siding.

TABLE 10

| | SAMPLE | |
| --- | --- | --- |
| | I-Control | J-Composite |
| Original VHIT inch-lbs/50 mils | 130 | 140 |
| Percent Retained VHIT After 2 Years in Florida | 31% | 61% |

This example shows that when a plasticized PVC capstock, as disclosed in this invention, is used over a rigid PVC substrate the composite has greatly improved retention of impact resistance as compared to a rigid PVC without a capstock.

The composites of this invention are useful for house and other building siding, shutters, roof vents, camper tops and the like. The composites have improved appearance retention and impact retention as compared to one piece extrusions of PVC, CPVC and ABS, as well as economic advantages since the substrate, which is the major volume portion of the composite, can contain inexpensive fillers and does not require expensive color pigments.

What is claimed is:

1. A weatherable composite adapted for outdoor exposure comprising;
   a. A capstock containing:
      (1) vinyl chloride polymer having an inherent viscosity of from about 0.45 to about 1.2,
      (2) at least 6 parts by weight of titanium dioxide per 100 parts by weight of vinyl chloride polymer,
      (3) from about 10 to less than about 35 parts by weight of a plasticizer per 100 parts by weight of vinyl chloride polymer, and
   b. A substrate selected from the group consisting of rigid vinyl chloride polymers, chlorinated vinyl chloride polymers, and acrylonitrile-butadiene-styrene polymers.

2. A composite of claim 1 wherein the capstock has a plasticizer level of from about 15 to about 25 parts by weight per 100 parts by weight of vinyl chloride polymer.

3. A composite of claim 2 wherein the capstock has a titanium dioxide level of from about 10 to about 20 parts by weight per 100 parts by weight of vinyl chloride polymer.

4. A composite of claim 3 wherein the vinyl chloride polymer in the capstock contains up to about 40% by weight of at least one other vinylidene monomer containing a terminal $CH_2 = C <$ group copolymerized therewith.

5. A composite of claim 4 wherein said vinylidene monomer is selected from the group consisting of $\alpha$-olefins containing 2 to 8 carbon atoms and alkyl acrylates wherein the alkyl group contains 1 to 10 carbon atoms.

6. A composite of claim wherein the substrate is a rigid vinyl chloride polymer.

7. A composite of claim 6 wherein the vinyl chloride polymer in the substrate contains a crosslinked polymer of an alkyl acrylate.

8. A composite of claim 7 wherein said alkyl acrylate polymer is a polymer containing more than 50% by weight of an alkyl acrylate wherein the alkyl group contains 2 to 8 carbon atoms and up to 50% by weight of at least one other vinylidene monomer having a terminal $CH_2 = C <$ grouping, said polymer being substantially insoluble in toluene.

9. A composite of claim 1 wherein the substrate is a chlorinated vinyl chloride polymer having a chlorine content of from about 60 to about 69 weight percent.

10. A composition of claim 1 wherein the substrate is an acrylonitrile-butadiene-styrene polymer containing from about 15 to about 35 weight percent acrylonitrile, from about 10 to about 35 weight percent butadiene, and from about 45 to about 65 weight percent styrene.

11. A weatherable vinyl siding adapted for outdoor exposure comprising:
  a. A capstock containing:
    (1) vinyl chloride polymer, having an inherent viscosity of from about 0.45 to about 1.2,
    (2) at least 6 parts by weight of titanium dioxide per 100 parts by weight of vinyl chloride polymer,
    (3) from about 10 to less than about 35 parts by weight of a plasticizer per 100 parts by weight of vinyl chloride polymer, and
  b. A substrate consisting of rigid vinyl chloride polymer, said capstock having a thickness of from about 1 mil to about 10 mils.

12. A vinyl siding of claim 11 wherein the thickness of said capstock is from about 2 mils to about 5 mils.

13. A vinyl siding of claim 12 wherein said capstock has a plasticizer level of from about 15 to about 25 parts by weight per 100 parts by weight of vinyl chloride polymer.

14. A vinyl siding of claim 13 wherein said capstock has a titanium dioxide level of from about 10 to about 20 parts by weight per 100 parts by weight of vinyl chloride polymer.

15. A shaped article adapted for outdoor exposure comprising:
  a. A capstock containing:
    (1) vinyl chloride polymer, having an inherent viscosity of from about 0.45 to about 1.2,
    (2) at least 6 parts by weight of titanium dioxide per 100 parts by weight of vinyl chloride polymer,
    (3) from about 10 to less than about 35 parts by weight or plasticizer per 100 parts by weight of vinyl chloride polymer, and
  b. A substrate consisting of any acrylonitrile-butadiene-styrene polymer having from about 15 to about 35 weight percent acrylonitrile, from about 10 to about 35 weight percent butadiene, and from about 45 to about 65 weight percent styrene.

16. An article of claim 5 wherein the substrate contains an acrylonitrile-butadiene-styrene polymer having from about 18 to about 24 weight percent acrylonitrile, from about 27 to about 33 weight percent butadiene, and from about 46 to about 52 weight percent styrene.

17. An article of claim 16 wherein the capstock has a plasticizer level of from about 15 to about 25 parts by weight per 100 parts by weight of vinyl chloride polymer.

18. An article of claim 17 wherein the capstock has a titanium dioxide level of from about 10 to about 20 parts by weight per 100 parts by weight of vinyl chloride polymer.

* * * * *